US010308095B2

(12) United States Patent
Oh et al.

(10) Patent No.: US 10,308,095 B2
(45) Date of Patent: Jun. 4, 2019

(54) HEATING, VENTILATION, AND AIR CONDITIONING SYSTEM FOR VEHICLE

(71) Applicants: Hyundai Motor Company, Seoul (KR); Kia Motors Corp., Seoul (KR)

(72) Inventors: Man Ju Oh, Yongin-si (KR); Sang Shin Lee, Suwon-si (KR); Jae Woo Park, Ansan-si (KR); So Yoon Park, Suwon-si (KR); Jae Woong Kim, Hwaseong-si (KR); So La Chung, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 15/802,732

(22) Filed: Nov. 3, 2017

(65) Prior Publication Data

US 2018/0345757 A1  Dec. 6, 2018

(30) Foreign Application Priority Data

May 30, 2017  (KR) ........................ 10-2017-0066760

(51) Int. Cl.
*B60H 1/00* (2006.01)
*B60H 1/32* (2006.01)

(52) U.S. Cl.
CPC ..... *B60H 1/00885* (2013.01); *B60H 1/00207* (2013.01); *B60H 1/00278* (2013.01); *B60H 1/00485* (2013.01); *B60H 1/00899* (2013.01); *B60H 1/3205* (2013.01);

(Continued)

(58) Field of Classification Search
CPC ............ B60H 1/00885; B60H 1/00207; B60H 1/00271; B60H 1/00278; B60H 1/00485; B60H 1/3205
See application file for complete search history.

(56) References Cited

U.S. PATENT DOCUMENTS

2015/0101789 A1* 4/2015 Enomoto ........... B60H 1/00485
165/202
2015/0258875 A1* 9/2015 Enomoto ................ B60L 1/003
165/104.31

(Continued)

FOREIGN PATENT DOCUMENTS

JP   2015-182487 A   10/2015
KR   10-0899270 B1   5/2009

(Continued)

*Primary Examiner* — Tho V Duong
(74) *Attorney, Agent, or Firm* — Morgan, Lewis & Bockius LLP

(57) ABSTRACT

A Heating, Ventilation, and Air Conditioning (HVAC) system for a vehicle, may include a first coolant line passing through a radiator; a second coolant line passing through an indoor air conditioning core and a high voltage battery core; a first coolant exchange line passing through a first heat exchanger; a second coolant exchange line passing through a second heat exchanger; a refrigerant line including the first heat exchanger, the second heat exchanger, and a compressor, in which coolant circulates; and a controller configured to control the first valve and the second valve to selectively connect the first coolant line or the second coolant line to the first coolant exchange line or the second coolant exchange line.

12 Claims, 7 Drawing Sheets

(52) U.S. Cl.
CPC .................... *B60H 1/00271* (2013.01); *B60H 2001/00307* (2013.01); *B60H 2001/00928* (2013.01)

(56) References Cited

U.S. PATENT DOCUMENTS

| | | | | |
|---|---|---|---|---|
| 2016/0010898 | A1* | 1/2016 | Takeuchi | B60H 1/00278 62/498 |
| 2016/0031291 | A1* | 2/2016 | Enomoto | B60H 1/00385 62/179 |
| 2016/0153345 | A1* | 6/2016 | Hosokawa | F01P 11/14 73/114.68 |
| 2016/0178253 | A1* | 6/2016 | Katoh | F25B 41/00 62/185 |
| 2016/0229282 | A1* | 8/2016 | Hettrich | B60K 11/02 |
| 2016/0339761 | A1* | 11/2016 | Enomoto | F25B 25/005 |
| 2017/0008373 | A1* | 1/2017 | Makihara | B60K 11/02 |

FOREIGN PATENT DOCUMENTS

| | | |
|---|---|---|
| KR | 10-1448656 B1 | 10/2014 |
| KR | 10-1558611 B1 | 10/2015 |

\* cited by examiner

HEATING, VENTILATION, AND AIR CONDITIONING SYSTEM FOR VEHICLE

CROSS-REFERENCE(S) TO RELATED APPLICATIONS

The present application claims priority to Korean Patent Application No. 10-2017-0066760, filed on May 30, 2017, the entire contents of which is incorporated herein for all purposes by this reference.

BACKGROUND OF THE INVENTION

Field of the Invention

The present invention relates to a Heating, Ventilation, and Air Conditioning (HVAC) system for a vehicle and, more particularly, to a HVAC system for a vehicle, which is configured to extend a driving distance by efficiently managing energy required for indoor air conditioning and the cooling and heating of a battery.

Description of Related Art

Recently, electric vehicles have become a social issue to, for example, implement an eco-friendly technology and solve a problem of energy exhaustion. An electric vehicle is operated using a motor which receives electricity from a battery to output power. Therefore, the electric vehicle has been in the spotlight, since the electric vehicle has advantages in that the electric vehicle emits no carbon dioxide, has very low noise level, and has a motor having an energy efficiency higher than that of an internal combustion engine.

A core technology for realizing such an electric vehicle is a technology relating to a battery module. Recently, research on weight reduction, miniaturization, and short charging time of a battery has been actively conducted. The battery module may be used in an optimal temperature environment to maintain optimal performance and ensure a long service life. However, it is difficult to use a battery module in an optimal temperature environment due to heat generated during the operation and a change in temperature of the external environment.

In addition, differently from an internal combustion engine, an electric vehicle does not have a waste heat source generated by combustion in a separate engine. Therefore, the electric vehicle uses an electric heating device for indoor heating in winter, which may be warmed up and thus employs a separate electric coolant heating type heater to improve battery charge/discharge performance in cold weather. That is, in an electric vehicle, to maintain an optimal temperature environment of a battery module, a cooling and heating system for controlling a temperature of the battery module is operated separately from a cooling and heating system for air conditioning in a vehicle. In other words, an electric vehicle employs two independent cooling and heating systems, a first of which is used for indoor cooling and heating and a second of which is used for controlling a temperature of a battery module.

However, an electric vehicle operating in the method as described above is unable to efficiently manage the energy, thus has a short running distance, and is thus unable to travel a long distance. The driving distance of the electric vehicle is reduced by 30% or more at the time of cooling in summer and by 40% or more at the time of heating in winter. Therefore, an electric vehicle has a severe indoor heating problem in winter, which does not occur in an internal combustion engine. An electric vehicle, which employs a high capacity Positive Temperature Coefficient (PCT) heater to solve the indoor heating problem in winter, is problematic in that the electric vehicle has a reduced running distance, and requires an excessive prime cost and has excessive weight due to the use of a heat pump.

The information disclosed in the present Background of the Invention section is only for enhancement of understanding of the general background of the invention and should not be taken as an acknowledgement or any form of suggestion that the present information forms the prior art already known to a person skilled in the art.

BRIEF SUMMARY

The present invention has been provided to solve the problems described above, and various aspects of the present invention are directed to providing a Heating, Ventilation, and Air Conditioning (HVAC) system for a vehicle, which can prevent a reduction in a driving distance even when an electric vehicle employs a high capacity PTC heater, and can prevent excessive costs and weight.

To achieve the above aspects, a HVAC system for a vehicle according to an exemplary embodiment of the present invention may include a first coolant line passing through a radiator and having a first end portion thereof connected to a first valve and a second end portion thereof connected to a second valve; a second coolant line passing through an indoor air conditioning core and a high-voltage battery core and having a first end portion thereof connected to the first valve and a second end portion thereof connected to the second valve; a first coolant exchange line passing through a first heat exchanger and having a first end portion thereof connected to the first valve and a second end portion thereof connected to the second valve; a second coolant exchange line passing through a second heat exchanger and having a first end portion thereof connected to the first valve and a second end portion thereof connected to the second valve; a refrigerant line including the first heat exchanger, the second heat exchanger, and a compressor, in which coolant circulates; and a controller configured to control the first valve and the second valve to selectively connect the first coolant line or the second coolant line to the first coolant exchange line or the second coolant exchange line.

The first valve and the second valve are four-way valves, and may be controlled to be opened or closed by the controller.

The indoor air conditioning core may be located at a point upstream of the high-voltage battery core.

The indoor air conditioning core may be connected to the high-voltage battery core on the second coolant line in parallel.

The indoor air conditioning core is located at a point upstream of the high-voltage battery core, a bypass line is disposed between the high-voltage battery core and the indoor air conditioning core wherein coolant can bypass the high-voltage battery core, and the bypass line includes a bypass valve wherein the coolant may be selectively supplied to the high-voltage battery core side.

The first coolant line includes a first pump and the second coolant line includes a second pump, wherein the first pump and the second pump may be driven or stopped under control of the controller.

The compressor is located at a point upstream of the first heat exchanger, and the first heat exchanger may be a hot exchanger.

The first heat exchanger may be a hot exchanger, and the second heat exchanger may be a cold exchanger.

The first coolant line further includes an electric component core, and the coolant heat-exchanged by the radiator, the first heat exchanger, or the second heat exchanger can cool the electric component core.

In a cold mode, the controller is configured to operate the compressor to circulate a refrigerant in the refrigerant line, and controls the first valve and the second valve to connect the first coolant line to the first coolant exchange line, and connect the second coolant line to the second coolant exchange line, wherein the electric component core can be cooled, an indoor volume can be cooled, and the high-voltage battery core can be selectively cooled.

In a hot mode, the controller is configured to operate the compressor to circulate a refrigerant in the refrigerant line, and controls the first valve and the second valve to connect the first coolant line to the second coolant exchange line, and connect the second coolant line to the first coolant exchange line, wherein the electric component core can be cooled, an indoor volume can be heated, and the high-voltage battery core can be selectively heated.

In a cool mode, the controller is configured to not operate the compressor, and controls the first valve and the second valve to connect the first coolant line to the first coolant exchange line, and connect the second coolant line to the second coolant exchange line, wherein the electric component core can be cooled, an indoor volume can be air-conditioned, and the high-voltage battery core can be selectively cooled.

In a warm mode, the controller is configured to not operate the compressor, and controls the first valve and the second valve to connect the first coolant line to the second coolant exchange line, and connect the second coolant line to the first coolant exchange line, wherein the electric component core can be cooled, an indoor volume can be heated, and the high-voltage battery core can be selectively cooled.

According to a HVAC system for a vehicle constructed as described above, the system includes an independently configured circuit for an integrated heat management module. Therefore, it is possible to retain a source technology, eliminate a water-heating PTC heater and an air-heating PTC heater, and eliminate a heat pump system, improving a driving distance and reducing the cost and weight. In addition, the integrated heat management module has an integrated single unit module structure and, when the integrated heat management module formed in a compact form is disposed in a radiator, the module has an advantageous layout and can achieve a compact HVAC system.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
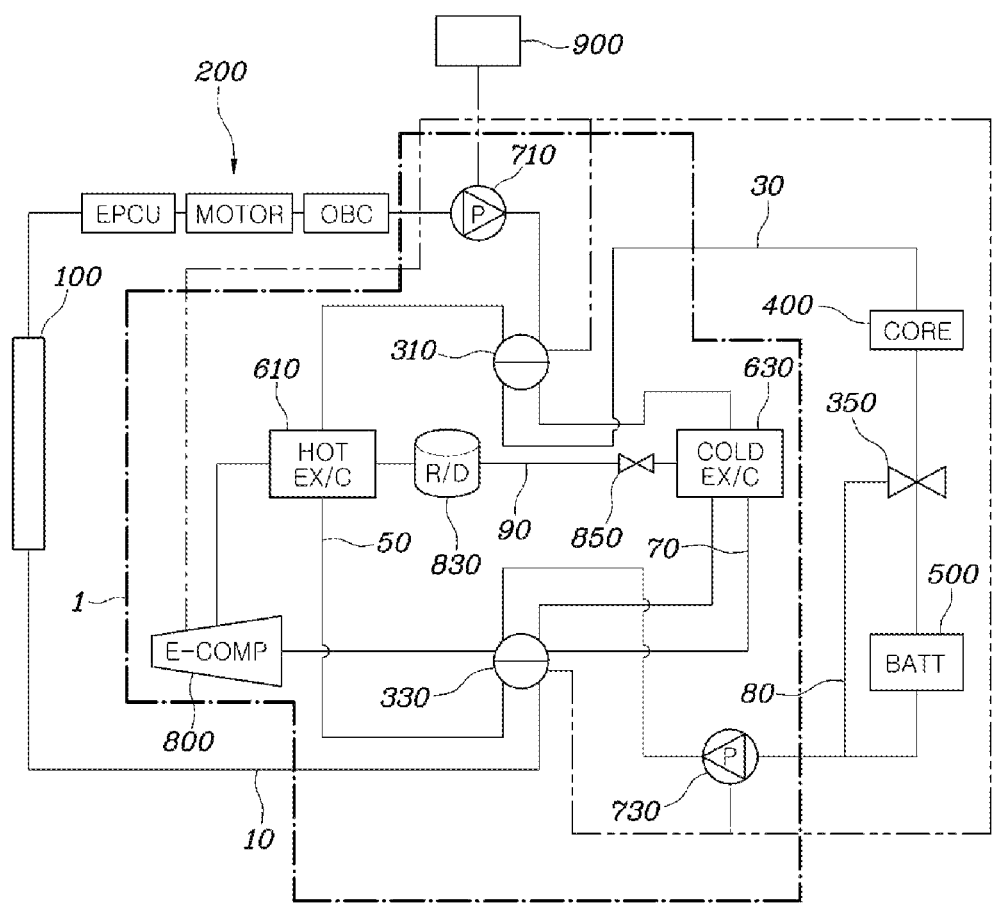
FIG. 1 illustrates a HVAC system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalents parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
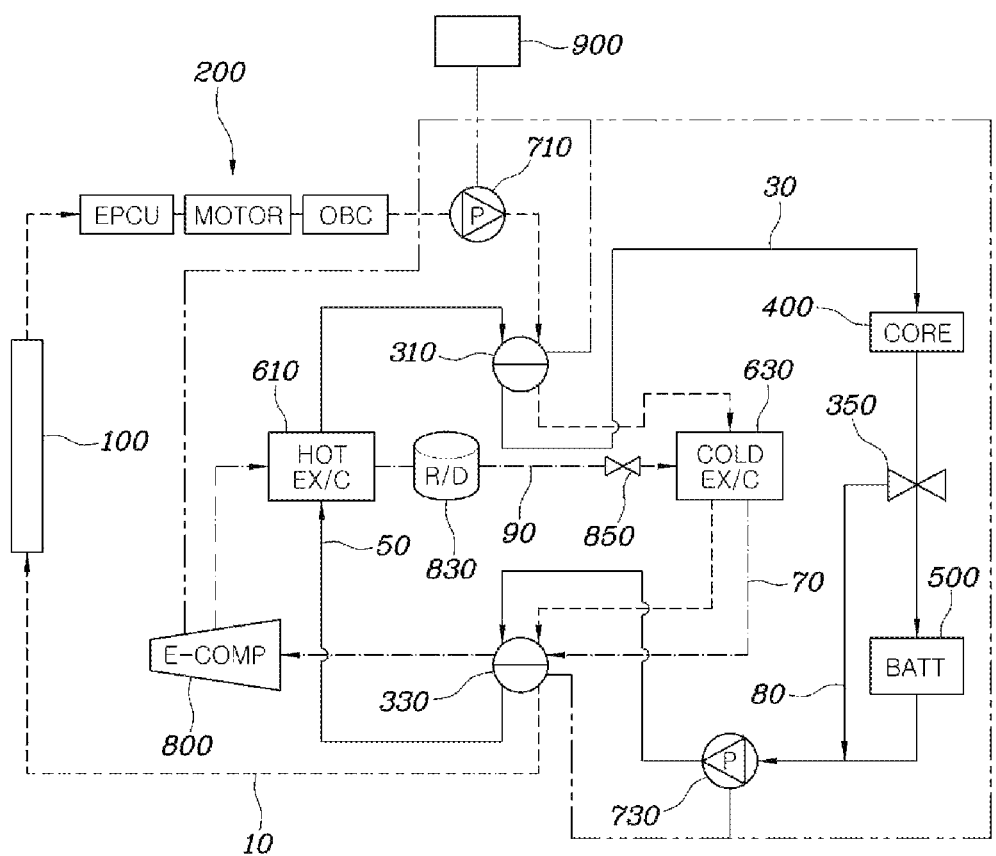
FIG. 2 illustrates the system of FIG. 1 in a cold mode.
Figure 3:
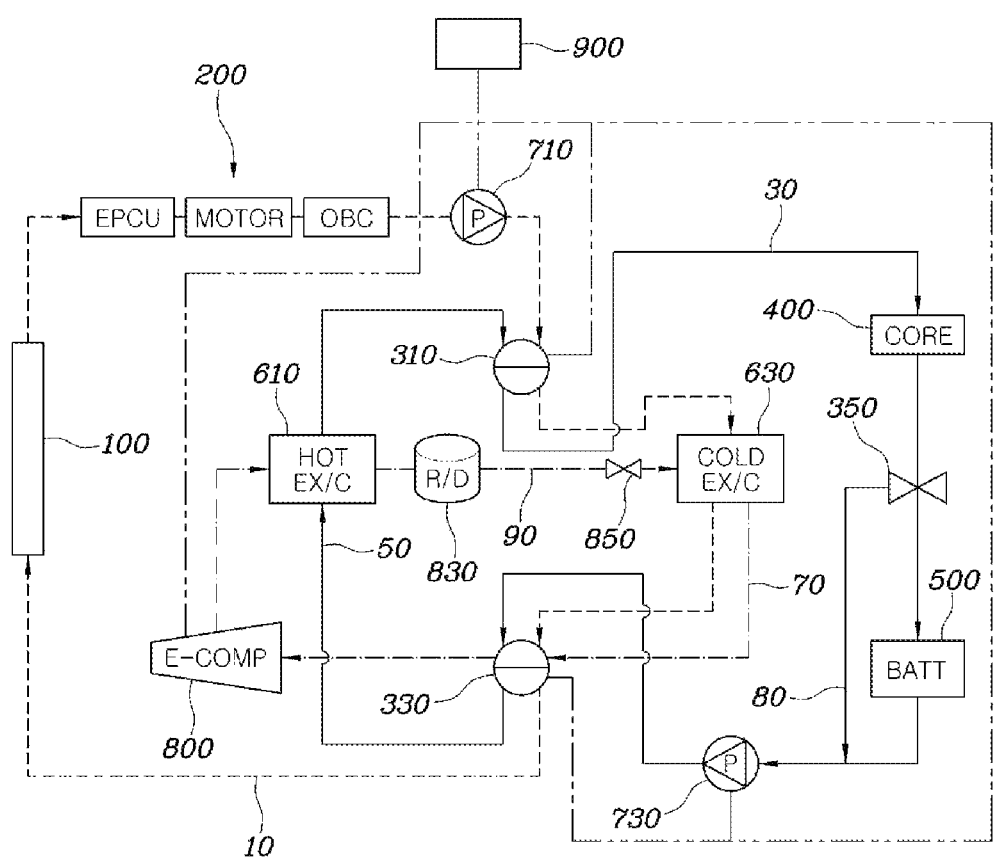
FIG. 3 illustrates the system of FIG. 1 in a hot mode.
Figure 4:
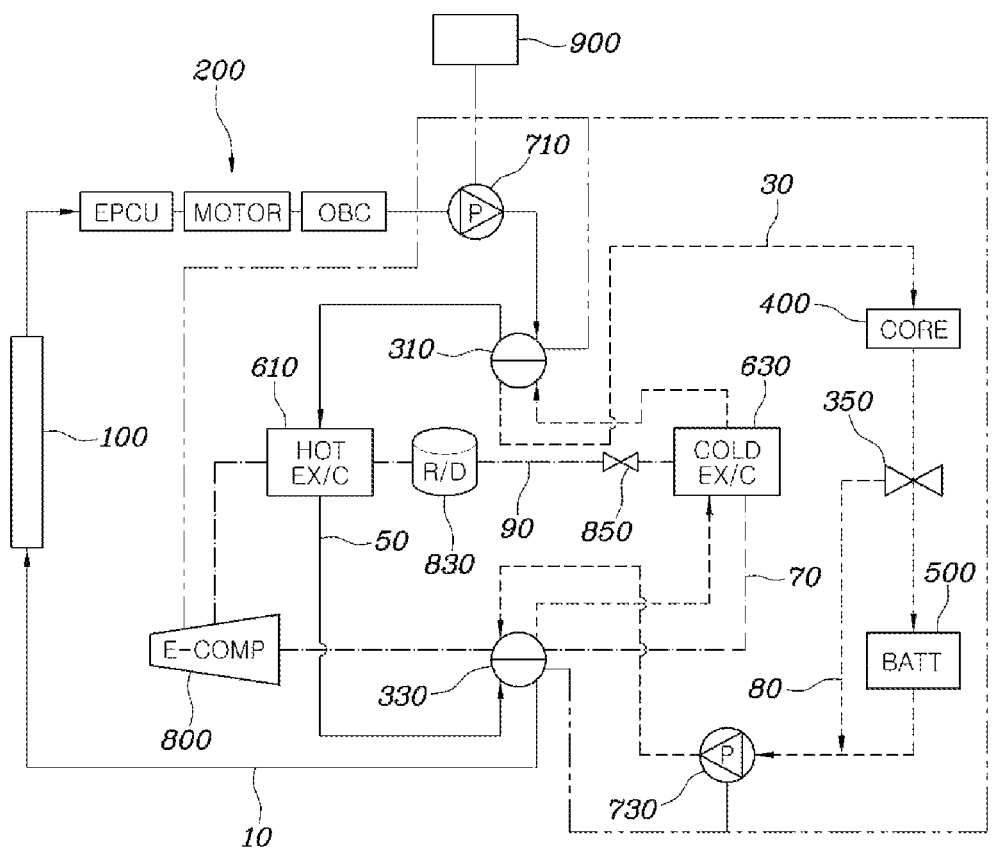
FIG. 4 illustrates the system of FIG. 1 in a cool mode.
Figure 5:
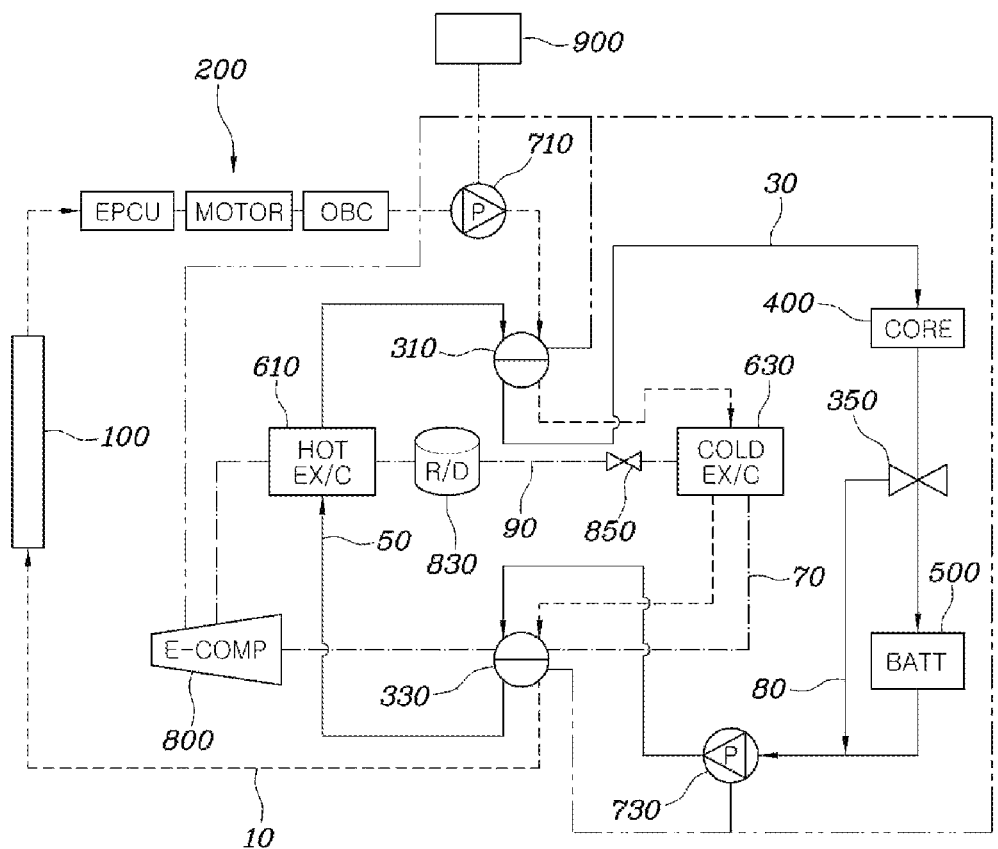
FIG. 5 illustrates the system of FIG. 1 in a warm mode.
Figure 6:
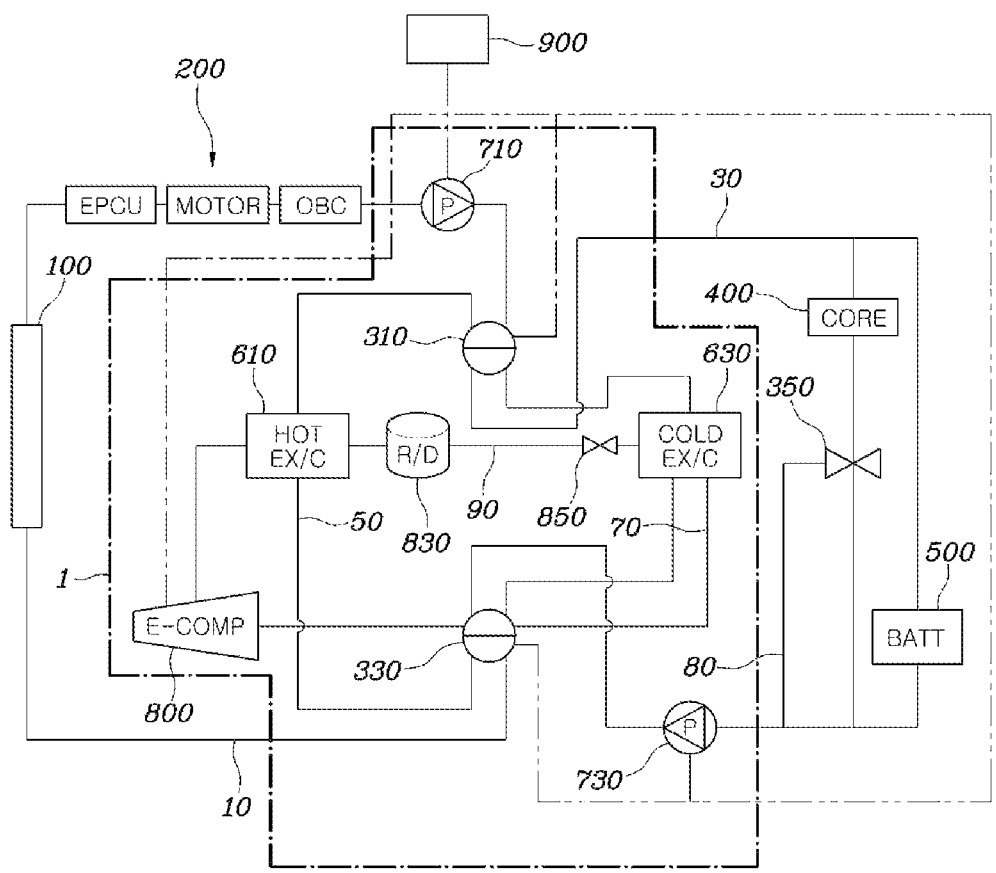
FIG. 6 is a view in which an indoor air conditioning core and a high-voltage battery core of the HVAC system of FIG. 1 are connected in parallel.
Figure 7:
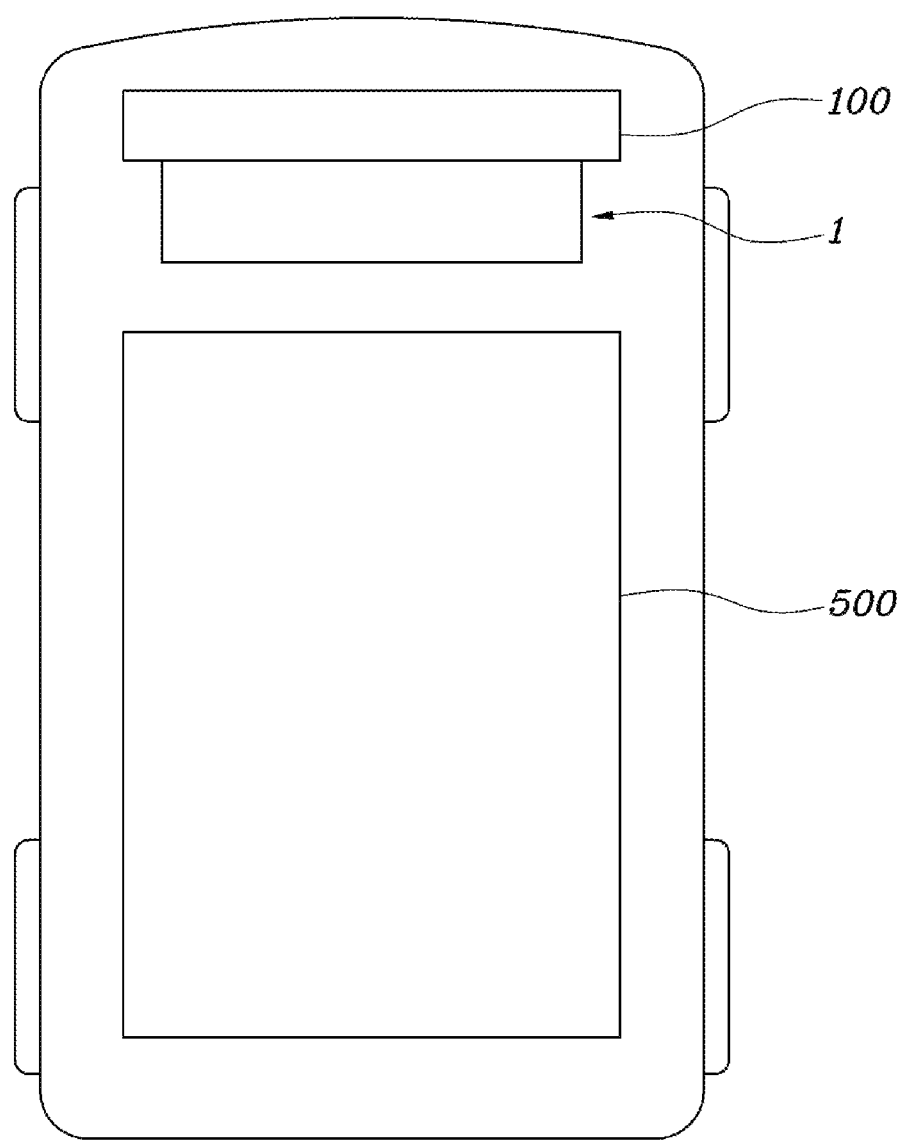
FIG. 7 illustrates a vehicle layout of FIG. 1.

FIG. 1 illustrates a HVAC system for a vehicle according to an exemplary embodiment of the present invention, FIG. 2 illustrates the system of FIG. 1 in a cold mode, FIG. 3 illustrates the system of FIG. 1 in a hot mode, FIG. 4 illustrates the system of FIG. 1 in a cool mode, and FIG. 5 illustrates the system of FIG. 1 in a warm mode. In addition, FIG. 6 is a view in which an indoor air conditioning core and a high-voltage battery core of the HVAC system of FIG. 1 are connected in parallel, and FIG. 7 illustrates a vehicle layout of FIG. 1.

As illustrated in FIG. 1, a HVAC system for a vehicle according to an exemplary embodiment of the present invention may include a first coolant line 10 passing through a radiator 100 and having a first end portion thereof connected to a first valve 310 and a second end portion thereof connected to a second valve 330; a second coolant line 30 passing through an indoor air conditioning core 400 and a high-voltage battery core 500 and having a first end portion thereof connected to the first valve 310 and a second end portion thereof connected to the second valve 330; a first coolant exchange line 50 passing through a first heat exchanger 610 and having a first end portion thereof connected to the first valve 310 and a second end portion thereof connected to the second valve 330; a second coolant exchange line 70 passing through a second heat exchanger 630 and having a first end portion thereof connected to the first valve 310 and a second end portion thereof connected to the second valve 330; a refrigerant line 90 including the first heat exchanger 610, the second heat exchanger 630, and a compressor 800, in which coolant circulates; and a controller 900 configured to control the first valve 310 and the second valve 330 to selectively connect the first coolant line 10 or the second coolant line 30 to the first coolant exchange line 50 or the second coolant exchange line 70.

The first coolant line 10 further includes an electric component core 200. Therefore, the first coolant line 10 includes the electric component core 200 and the radiator 100, and the electric component core 200 may include an Electric Power Control Unit (EPCU), a motor, an On Board Charger (OBC), etc., which are configured to be cooled. Since the radiator 100 is required to cool the electric component core 200, the radiator 100 may be located at a point upstream of the electric component core 200. In addition, the first coolant line 10 includes a first pump 710, and the controller 900 controls the first pump 710 to be driven or stopped. The first pump 710 is driven, and thus a coolant of the first coolant line 10 circulates. The electrical component core 200 may be connected to the first coolant line 10 in parallel. In such a case, the flow resistance of the first coolant line 10 is reduced.

The second coolant line 30 includes the indoor air conditioning core 400 and the high-voltage battery core 500, and the indoor air conditioning core 400 is located at a point upstream of the high-voltage battery core 500. However, as illustrated in FIG. 6, the indoor air conditioning core 400 and the high-voltage battery core 500 may be connected in parallel. In addition, a bypass line 80 is disposed between the high-voltage battery core 500 and the indoor air conditioning core 400 wherein coolant can bypass the high-voltage battery core 500. The bypass line 80 includes a bypass valve 350 configured to selectively supply the coolant to the high-voltage battery core 500 side. The bypass valve 350 may be controlled by the controller 900 or may be a valve that is automatically opened or closed according to a temperature of coolant without intervention of the controller 900. However, regardless of the use of any valve, all valves can be applied as long as the valves have a function of flow rate control to distribute the flow rate to the high-voltage battery core 500 side. The second coolant line 30 includes a second pump 730, and the controller 900 is configured to control the second pump 730 to be driven or stopped. The second pump 730 is driven, and thus the coolant of the second coolant line 30 circulates.

The first coolant exchange line 50 is configured wherein both end portions of the first heat exchanger 610 are connected to the first valve 310 and the second valve 330, respectively. The second coolant exchange line 70 is configured wherein both end portions of the second heat exchanger 630 are connected to the first valve 310 and the second valve 330, respectively. The first valve 310 and the second valve 330 are four-way valves, and are controlled to be opened or closed by the controller 900, wherein the first coolant line 10 or the second coolant line 30 is selectively connectable to the first coolant exchange line 50 or the second coolant exchange line 70.

The refrigerant line 90 includes the first heat exchanger 610, the second heat exchanger 630, and the compressor 800, and is configured to circulate a refrigerant. The first heat exchanger 610 is a hot exchanger, and the second heat exchanger 630 is a cold exchanger. Thus, for circulation of refrigerant and favorable heat transfer, the compressor 800 may be located at a point upstream of the first heat exchanger 610, which is a hot exchanger.

Accordingly, in the HVAC system for a vehicle of the present invention, a refrigerant line 90 including a first pump 710, a second pump 730, a first valve 310, a second valve 330, a first heat exchanger 610, and a second heat exchanger 630 are configured as an integrated heat management module 1. Therefore, the system has a compact size and achieves an advantageous layout.

The flow of refrigerant and coolant in each mode will be described with reference to FIG. 2, FIG. 3, FIG. 4, and FIG. 5. In general, the HVAC system for a vehicle of the present invention may have four modes including a cold mode for summer cooling, a hot mode for winter heating, a cool mode for cool spring/autumn weather, and a warm mode for cold spring/autumn weather.

Firstly, a case of a cold mode in summer will be described with reference to FIG. 2. In the cold mode, the controller 900 operates the compressor 800 to circulate the refrigerant in the refrigerant line 90. The refrigerant passes through the compressor 800 to be in a gaseous state with a high temperature and a high pressure, the refrigerant heats coolant while passing through the first heat exchanger 610 and radiating heat, and the temperature of the refrigerant itself falls, liquefying the refrigerant. In the liquefied state, the refrigerant is temporarily stored in a receiver drier 830, and the refrigerant cools the coolant while passing through the second heat exchanger 630 and absorbing heat. The flow of the refrigerant as described above is indicated by a dashed dotted line in FIG. 2.

The controller 900 is configured to control the first valve 310 and the second valve 330 to connect the first coolant line 10 to the first coolant exchange line 50, and connect the second coolant line 30 to the second coolant exchange line 70. That is, the first coolant line 10 and the first coolant exchange line 50 are connected by the first valve 310 and the second valve 330 to form a coolant flow path including the first pump 710, the first valve 310, the first heat exchanger 610, the second valve 330, the radiator 100, the electric component core 200, and the first pump 710, through which the coolant circulates. Therefore, the coolant is heated in the first heat exchanger 610 after passing through the first valve 310 and supplied to the radiator 100 through the second valve 330. The coolant cooled by the external air in the radiator 100 cools the electric component core 200 and then circulates again through the first pump 710 and the first valve 310. The flow of the coolant as described above is indicated by a dotted line in FIG. 2.

In addition, the second coolant line 30 and the second coolant exchange line 70 are connected by the first valve 310 and the second valve 330 to form a coolant flow path including the second pump 730, the second valve 330, the second heat exchanger 630, the first valve 310, the indoor air conditioning core 400, the high-voltage battery core 500, and the second pump 730, through which the coolant circulates. Accordingly, the coolant is cooled in the second heat exchanger 630 after passing through the second pump 730 and the second valve 330, and is supplied to the indoor air conditioning core 400 through the first valve 310. Therefore, an indoor volume is cooled. In the present case, when the high-voltage battery core 500 is required to be cooled, the bypass valve 350 on the high-voltage battery core 500 side is opened to cool the high-voltage battery core 500. When the high-voltage battery core 500 is not required to be cooled, the bypass valve 350 on the bypass line 80 side is opened and the coolant is thus bypassed without passing through the high-voltage battery core 500. The flow of the coolant as described above is indicated by a dotted line and a solid line in FIG. 2. In the drawing, the bypass valve 350 is partially opened toward the high-voltage battery core 500 and the coolant flows to both the bypass line 80 and the high-voltage battery core 500 sides.

A case of a hot mode in winter will be described with reference to FIG. 3. In the hot mode, the controller 900 is configured to operate the compressor 800 to circulate the refrigerant in the refrigerant line 90. The refrigerant passes through the compressor 800 to be in a gaseous state with a high temperature and a high pressure. The refrigerant heats coolant while passing through the first heat exchanger 610 and radiating heat, the temperature of the refrigerant itself falls, and the refrigerant is thus liquefied. In the liquefied state, the refrigerant is temporarily stored in the receiver drier 830, and the refrigerant cools the coolant while passing through the second heat exchanger 630 and absorbing heat. The flow of the refrigerant as described above is indicated by a dashed dotted line in FIG. 3.

The controller 900 is configured to control the first valve 310 and the second valve 330 to connect the first coolant line 10 to the second coolant exchange line 70, and connect the second coolant line 30 to the first coolant exchange line 50. That is, the first coolant line 10 and the second coolant exchange line 70 are connected by the first valve 310 and the second valve 330 to form a coolant flow path including the first pump 710, the first valve 310, the second heat exchanger 630, the second valve 330, the radiator 100, the electric component core 200, and the first pump 710, through which the coolant circulates. Therefore, the coolant is cooled in the second heat exchanger 630 after passing through the first valve 310 and supplied to the radiator 100 through the second valve 330. The coolant heated by the external air in the radiator 100 cools the electric component core 200 and then circulates again through the first pump 710 and the first valve 310. The flow of the coolant as described above is indicated by a dotted line in FIG. 3.

In addition, the second coolant line 30 and the first coolant exchange line 50 are connected by the first valve 310 and the second valve 330 to form a coolant flow path including the second pump 730, the second valve 330, the first heat exchanger 610, the first valve 310, the indoor air conditioning core 400, the high-voltage battery core 500, and the second pump 730, through which the coolant circulates. Accordingly, the coolant is cooled in the first heat exchanger 610 after passing through the second pump 730 and the second valve 330, and is supplied to the indoor air conditioning core 400 through the first valve 310. Therefore, an indoor volume is heated. When the high-voltage battery core 500 is required to be heated, the bypass valve 350 on the high-voltage battery core 500 side is opened to heat the high-voltage battery core 500. When the high-voltage battery core 500 is not required to be heated, the bypass valve 350 on the bypass line 80 side is opened and the coolant is thus bypassed without passing through the high-voltage battery core 500. The flow of the coolant as described above is indicated by a solid line in FIG. 3. In the drawing, the bypass valve 350 is partially opened toward the high-voltage battery core 500 and the coolant flows to both the bypass line 80 and the high-voltage battery core 500 sides.

Thirdly, a case of a cool mode in spring/autumn will be described with reference to FIG. 4. In the cool mode, the controller 900 is configured to not operate the compressor 800. The controller 900 controls the first valve 310 and the second valve 330 to connect the first coolant line 10 to the first coolant exchange line 50, and connect the second coolant line 30 to the second coolant exchange line 70. That is, the first coolant line 10 and the first coolant exchange line 50 are connected by the first valve 310 and the second valve 330 to form a coolant flow path including the first pump 710, the first valve 310, the first heat exchanger 610, the second valve 330, the radiator 100, the electric component core 200, and the first pump 710, through which coolant circulates. Therefore, the coolant is heated in the first heat exchanger 610 after passing through the first valve 310 and supplied to the radiator 100 through the second valve 330. The coolant cooled by the external air in the radiator 100 cools the electric component core 200 and then circulates again through the first pump 710 and the first valve 310. The flow of the coolant as described above is indicated by a solid line in FIG. 4.

In addition, the second coolant line 30 and the second coolant exchange line 70 are connected by the first valve 310 and the second valve 330 to form a coolant flow path including the second pump 730, the second valve 330, the second heat exchanger 630, the first valve 310, the indoor air conditioning core 400, the high-voltage battery core 500, and the second pump 730, through which the coolant circulates. However, in the cool mode, the second pump 730 is not driven when the indoor temperature is adjusted to the outside temperature. That is, the second pump 730 is operated only when the indoor temperature is raised during indoor air conditioning, and the coolant flows through the second valve 330 and the second heat exchanger 630, and is supplied to the indoor air conditioning core 400 through the first valve 310. At the present time, since the coolant absorbs a small amount of heat while passing through the first valve 310, the second valve 330, and the high-voltage battery core 500 and flows into the indoor air conditioning core 400 in such state, an indoor volume is in a mix mode. In the present case, when the high-voltage battery core 500 is required to be cooled, the bypass valve 350 on the high-voltage battery core 500 side is opened to cool the high-voltage battery core 500. When the high-voltage battery core 500 is not required to be cooled, the bypass valve 350 on the bypass line 80 side is opened and the coolant is thus bypassed without passing through the high-voltage battery core 500. The flow of the coolant as described above is indicated by a dotted line in FIG. 4. In the drawing, the bypass valve 350 is partially opened toward the high-voltage battery core 500 and the coolant flows to both the bypass line 80 and the high-voltage battery core 500 sides.

Finally, a case of a warm mode in spring/autumn will be described with reference to FIG. 5. In the warm mode, the controller 900 is configured to not operate the compressor 800. The controller 900 controls the first valve 310 and the second valve 330 to connect the first coolant line 10 to the second coolant exchange line 70, and connect the second coolant line 30 to the first coolant exchange line 50. That is, the first coolant line 10 and the second coolant exchange line 70 are connected by the first valve 310 and the second valve 330 to form a coolant flow path including the first pump 710, the first valve 310, the second heat exchanger 630, the second valve 330, the radiator 100, the electric component core 200, and the first pump 710, through which coolant circulates. However, in the warm mode, the first pump 710 is driven only when the electric component core 200 is required to be cooled. When the first pump 710 is driven, the coolant is cooled in the second heat exchanger 630 after passing through the first valve 310 and supplied to the radiator 100 through the second valve 330. The coolant cooled by the external air in the radiator 100 cools the electric component core 200 and then circulates again through the first pump 710 and the first valve 310. The flow of the coolant as described above is indicated by a dotted line in FIG. 5.

In addition, the second coolant line 30 and the first coolant exchange line 50 are connected by the first valve 310 and the second valve 330 to form a coolant flow path including the second pump 730, the second valve 330, the first heat exchanger 610, the first valve 310, the indoor air conditioning core 400, the high-voltage battery core 500, and the second pump 730, through which the coolant circulates. At the present time, an indoor volume is in a heating mode. In the present case, when the high-voltage battery core 500 is required to be cooled, the bypass valve 350 on the high-voltage battery core 500 side is opened to cool the high-voltage battery core 500 and, when the high-voltage battery core 500 is not required to be cooled, the bypass valve 350 on the bypass line 80 side is partially opened relatively less than when the high-voltage battery core 500 is required to be cooled, wherein the coolant flows through the high-voltage battery core 500 and absorbs the exothermic energy of the high-voltage battery core 500. Therefore, the exothermic energy of the high-voltage battery core 500 is used for heating the indoor air conditioning core 400. The flow of the coolant as described above is indicated by a solid line in FIG. 5.

The HVAC system for a vehicle according to an exemplary embodiment of the present invention as described above includes an independently configured circuit for an integrated heat management module 1. Therefore, it is possible to retain a source technology, eliminate a water-heating PTC heater and an air-heating PTC heater, and eliminate a heat pump system, improving a driving distance and reducing the cost and weight. In addition, the integrated heat management module 1 has an integrated single unit module structure and, when the integrated heat management module 1 formed in a compact form is disposed in the radiator 100, the module has an advantageous layout and can achieve a compact HVAC system.

For convenience in explanation and accurate definition in the appended claims, the terms "upper", "lower", "up", "down", "upwards", "downwards", "inside", "outside", "internal", "outer", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioning system for a vehicle, comprising:
a first coolant line passing through a radiator and having a first end portion connected to a first valve and a second end portion connected to a second valve;
a second coolant line passing through an indoor air conditioning core and a high-voltage battery core and having a first end portion connected to the first valve and a second end portion connected to the second valve;
a first coolant exchange line passing through a first heat exchanger and having a first end portion connected to the first valve and a second end portion connected to the second valve;
a second coolant exchange line passing through a second heat exchanger and having a first end portion connected to the first valve and a second end portion connected to the second valve;
a refrigerant line including the first heat exchanger, the second heat exchanger, and a compressor, in which coolant circulates; and
the first valve and the second valve are controlled by a controller such that the first coolant line or the second coolant line is selectively connectable to the first coolant exchange line or the second coolant exchange line,
wherein a bypass line is disposed between the high-voltage battery core and the indoor air conditioning core, coolant being configured to bypass the high-voltage battery core, and
wherein the bypass line includes a bypass valve, the coolant being selectively supplied to a high-voltage battery core side.

2. The system of claim 1, wherein the first valve and the second valve are four-way valves, and are controlled to be opened or closed by the controller.

3. The system of claim 1, wherein the indoor air conditioning core is located at a point upstream of the high-voltage battery core.

4. The system of claim 1, wherein the indoor air conditioning core is connected to the high-voltage battery core on the second coolant line in parallel.

5. The system of claim 1, wherein the first coolant line includes a first pump and the second coolant line includes a second pump, wherein the first pump and the second pump are driven or stopped under control of the controller.

6. The system of claim 1, wherein the compressor is located at a point upstream of the first heat exchanger, and the first heat exchanger is a hot exchanger.

7. The system of claim 1, wherein the first heat exchanger is a hot exchanger, and the second heat exchanger is a cold exchanger.

8. The system of claim 7, wherein the first coolant line further includes an electric component core, and the coolant heat-exchanged by the radiator, the first heat exchanger, or the second heat exchanger cools the electric component core.

9. The system of claim 8, wherein, in a cold mode, the controller is configured to operate the compressor to circulate a refrigerant in the refrigerant line, and controls the first valve and the second valve to connect the first coolant line to the first coolant exchange line, and connect the second coolant line to the second coolant exchange line, such that the electric component core is cooled, an indoor volume is cooled, and the high-voltage battery core is selectively cooled.

10. The system of claim 8, wherein, in a hot mode, the controller is configured to operate the compressor to circulate a refrigerant in the refrigerant line, and controls the first valve and the second valve to connect the first coolant line to the second coolant exchange line, and connect the second coolant line to the first coolant exchange line, such that the electric component core is cooled, an indoor volume is heated, and the high-voltage battery core is selectively heated.

11. The system of claim 8, wherein, in a cool mode, the controller is configured to not operate the compressor, and controls the first valve and the second valve to connect the first coolant line to the first coolant exchange line, and connect the second coolant line to the second coolant exchange line, such that the electric component core is cooled, an indoor volume is air-conditioned, and the high-voltage battery core is selectively cooled.

12. The system of claim 8, wherein, in a warm mode, the controller is configured to not operate the compressor, and controls the first valve and the second valve to connect the first coolant line to the second coolant exchange line, and connect the second coolant line to the first coolant exchange line, such that the electric component core is cooled, an indoor volume is heated, and the high-voltage battery core is selectively cooled.

\* \* \* \* \*